(12) United States Patent
Needham

(10) Patent No.: US 6,710,740 B2
(45) Date of Patent: Mar. 23, 2004

(54) RECORDING-LOCATION DETERMINATION

(75) Inventor: Bradford H. Needham, North Plains, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/090,943

(22) Filed: Mar. 4, 2002

(65) Prior Publication Data

US 2003/0164796 A1 Sep. 4, 2003

(51) Int. Cl.[7] ............................................. H04B 7/185
(52) U.S. Cl. .............................. 342/357.13; 342/357.06
(58) Field of Search ..................... 342/357.01, 357.06, 342/357.07, 357.13; 701/213, 215; 455/456, 457

(56) References Cited

U.S. PATENT DOCUMENTS

| | | |
|---|---|---|
| 5,296,884 A | 3/1994 | Honda et al. |
| 5,936,572 A | 8/1999 | Loomis et al. |
| 5,987,136 A | 11/1999 | Schipper et al. |
| 6,083,353 A * | 7/2000 | Alexander ................. 202/158 |
| 6,378,132 B1 * | 4/2002 | Grandin et al. ............. 725/146 |
| 6,466,275 B1 * | 10/2002 | Honey et al. ............... 348/722 |
| 6,493,650 B1 * | 12/2002 | Rodgers et al. ............. 702/150 |
| 2001/0022621 A1 | 9/2001 | Squibbs |
| 2002/0143469 A1 * | 10/2002 | Alexander et al. ............ 702/2 |

FOREIGN PATENT DOCUMENTS

| | | |
|---|---|---|
| EP | 0 855 835 A2 | 7/1998 |
| EP | 1 133 150 A2 | 9/2001 |
| GB | 2 322 248 A | 8/1998 |
| WO | WO 00/75682 A1 | 12/2000 |
| WO | WO 01/50151 A1 | 7/2001 |

* cited by examiner

*Primary Examiner*—Dao Phan
(74) *Attorney, Agent, or Firm*—Steven D. Yates

(57) ABSTRACT

Tracking and multiple signal sources, such as cellular phone towers, 802.11 hotspots, Radio Data System (RDS) transmitters, or the like, and using one or more of these sources to determine a current position that can be associated with a recording, such as a digital camera photo or other digital recording, conventional camera photo, or other recording.

8 Claims, 5 Drawing Sheets

RECORDING-LOCATION DETERMINATION

FIELD

The invention generally relates to annotating a recording, such as a photograph, video, etc. with data indicating a location where recording occurred, and more particularly to tracking multiple different signal sources to facilitate determining the location when a primary locating technique fails.

BACKGROUND

When taking a recording of a place or an event, it is often desirable to associate a location, typically the location at which the recording is made, with the recording so that one may later review the recording and be reminded of where it occurred. Associating locations with recordings is often a tedious prospect, especially when several different places are visited and the recordings are not available for annotation until later-on, such as returning from a trip. Often, due to tediousness, or poor memory after the fact, associations are not performed at all.

There has been an attempt to facilitate making such associations with digital camera photographs. Here, GPS (Global Positioning System) track log data is used to cross-reference a time at which a digital camera indicates a photograph occurred photograph with timed entries in the GPS track log, thus identifying where the photograph occurred. There are significant limitations to this approach, some of which are inherent to GPS systems.

For example, GPS systems take a long time to start up, thus initial pictures may occur with no GPS data available to indicate where the picture occurred. Also, GPS systems require adequate reception from at least four satellites in order to accurately determine spatial position in three dimensions. Obtaining adequate signal from four satellites is often difficult depending on the terrain through which one travels, as various conditions, such as physical obstructions, thick tree cover, tall buildings, etc., may cause a satellite to become obscured and thus preclude obtaining GPS position data. Related to this is that when a GPS receiver loses track of its satellites, the receiver may then either give out invalid position information, e.g., zero-values, or repeat last known valid position data, which may be quite wrong if one is traveling quickly. Such GPS data can result in wildly incorrect position data being associated with pictures.

BRIEF DESCRIPTION OF THE DRAWINGS

The features and advantages of the present invention will become apparent from the following detailed description of the present invention in which.

DETAILED DESCRIPTION

While traveling, it is assumed a primary positioning service, e.g., GPS, is used to determine a current location that may be associated with a recording, e.g., a picture, audio and/or visual recording, etc. However, the primary positioning service may, on occasion, temporarily or permanently fail. Thus, while traveling, secondary signal sources are tracked so that they can be used to determine an approximate location that may be associated with the recording.

Note that the phrase "position data" is used herein to refer to GPS track log data, coordinate data, or other data representing a position in time/space. The term "location" refers to human-intelligible data, e.g., a street name, city, geographic reference, landmark, etc. corresponding to position data. The phrase "signal source" refers to any signal which may be used to determine or facilitate determining a current location, including typical positioning services such as GPS, LORAN (Long Range Navigation), and other radionavigation systems. The phrase "signal source" also includes other signals not intended to be part of a positioning service, but nonetheless have characteristics, such as a determinable location for the signal source, that can be used to facilitate determining a current location; exemplary sources include cellular phone towers, 802.11 hotspots, Radio Data System (RDS) transmitters, or the like.

It is assumed signal sources transmit at least an identifier for the source. It will be appreciated that signal source may transmit other data as well, such as the physical location and/or position of the signal source. If the signal source's physical location is not (conveniently) provided, it will be appreciated that coverage-maps may be consulted to cross-reference signal sources with physical locations. This lookup may occur in (near) real time or be deferred until a later time. Depending on the secondary signal sources available at any given time, and information known or obtainable about the signal sources, a current position for a recording can be determined with varying accuracy.

Figure 1:
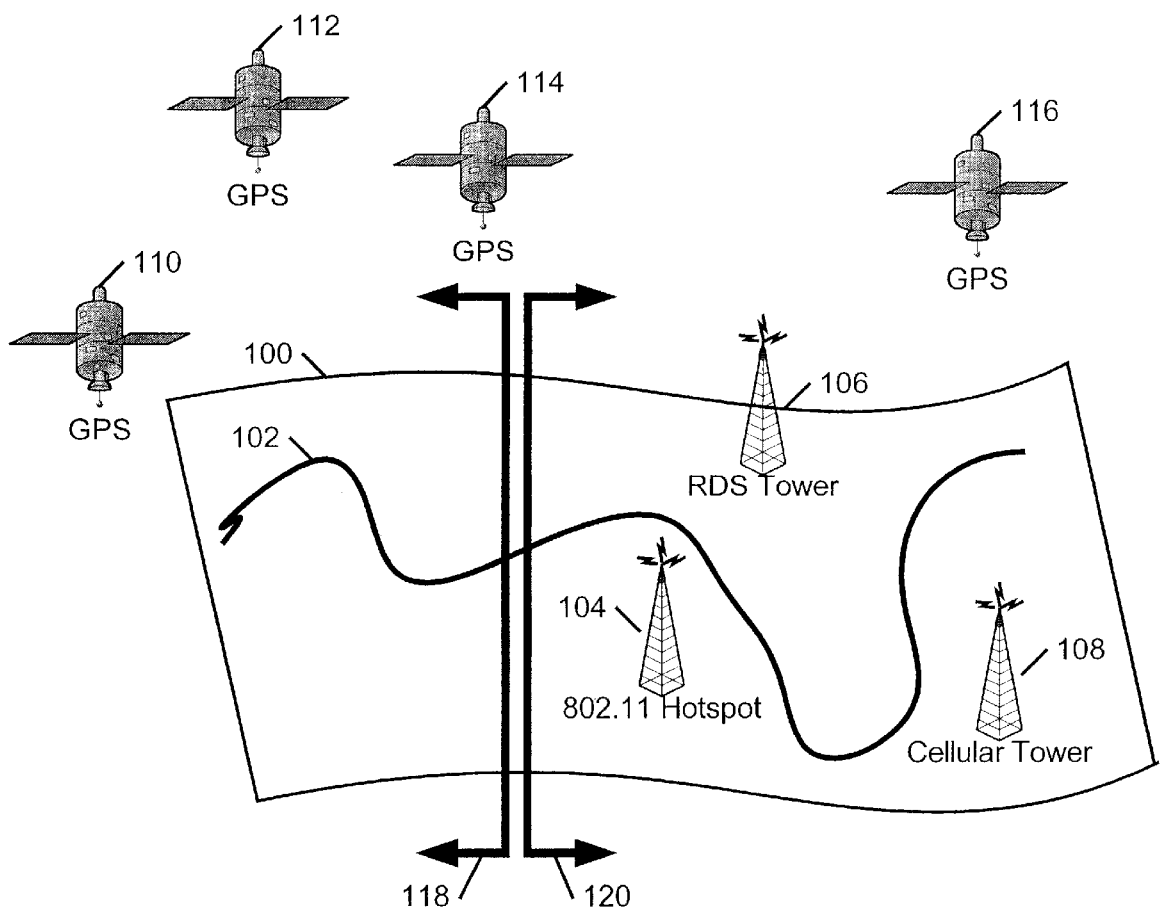
FIG. 1 illustrates an exemplary environment, such as a terrain over which one is traveling and recording, e.g., taking pictures, recording movies, etc.

FIG. 1 illustrates an exemplary environment 100, such as a terrain over which one is traveling and recording, e.g., taking pictures, recording movies, etc.

Illustrated is a travel path 102 that passes several transmission towers 104, 106, 108. Assume that GPS data from GPS satellites 110, 112, 114, 116 is primarily used to track one's position while traveling, but that reception area 118 corresponds to reliable GPS reception, and reception area 120 corresponds to unreliable GPS reception. The illustrated travel path 102 starts with reliable reception, and moves into unreliable reception. As will be discussed below, when in the unreliable reception area 120, the presence of other secondary signal sources, e.g., transmission towers 104, 106, 108, may be used to determine one's location which may then be associated with a recording.

Figure 2:
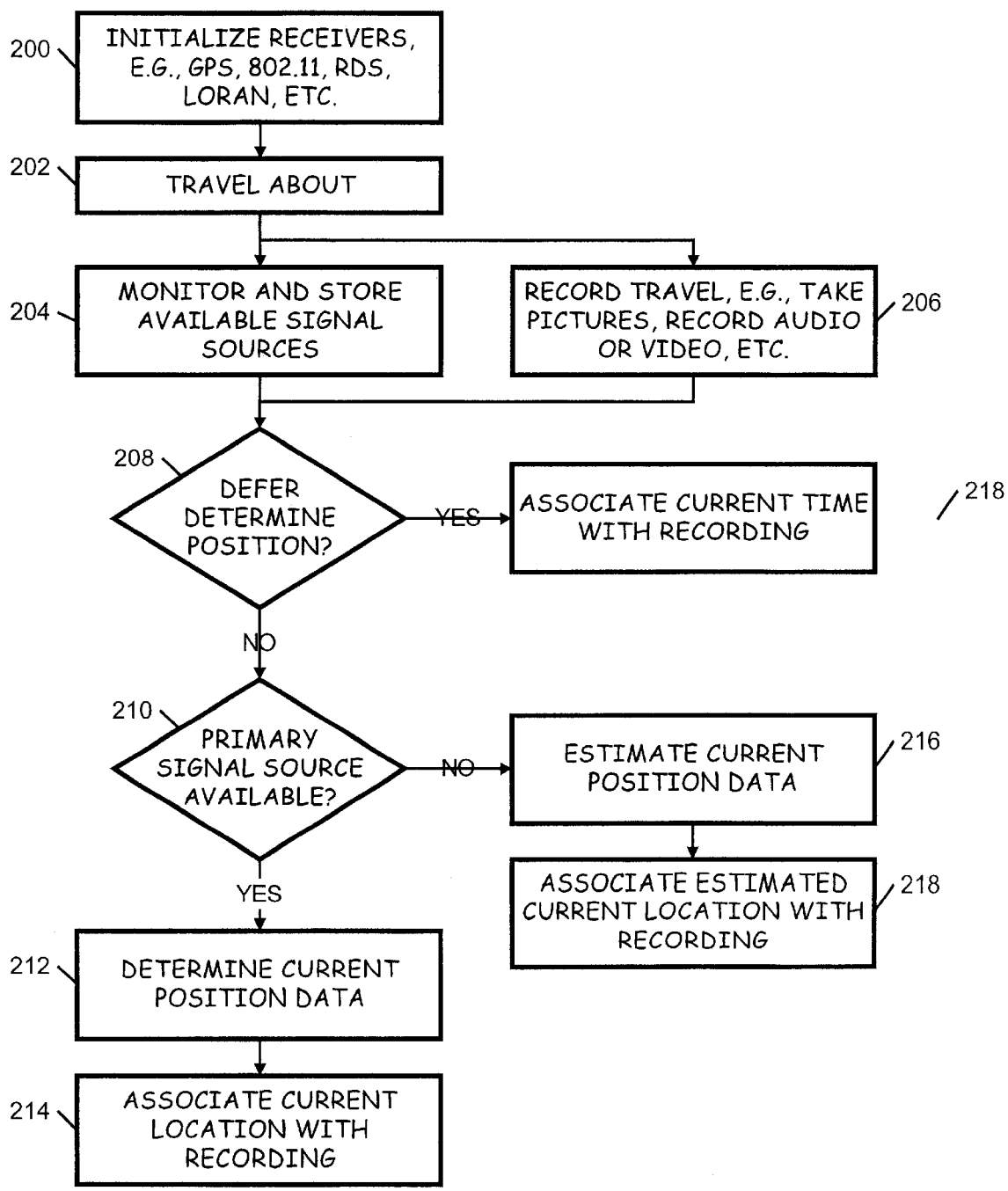
FIG. 2 illustrates a general flowchart according to one embodiment of the invention for associating positioning data with a recording.

FIG. 2 illustrates a general flowchart according to one embodiment of the invention for associating a location with a recording.

Primary and secondary receivers, e.g., GPS, cellular, 802.11, etc. are initialized 200 so that signal sources may be received while traveling 202. While traveling 202, signal sources are monitored and stored 204, such as in a database, log, or other storage. In one embodiment, monitoring and storing 204 is performed with separate devices (see also FIG. 3). In another embodiment, a receive-only device comprising multiple embedded receivers for various different types of signal sources, is used to receive signals from various signal sources. In a further embodiment, the receive-only device is incorporated within a recorder.

Parallel to monitoring signal sources, travel is recorded 206, e.g., pictures taken, audio/visual data recorded, etc. In one embodiment, a test 208 is performed to determine whether to immediately attempt to associate a current position with a recording, or to defer current location identification for a later time, e.g., after travel is complete. The basis of the decision may rest on a number of factors, including resources required to determine a current location. It will be appreciated by one skilled in the art that associating data with recordings may take various forms depending on the type of recording device and data to be associated. For example, in one embodiment, a digital camera stores recordings in a Japan Electronic Industry Development Association (JEIDA) Exchangeable Image File (EXIF) file format, and position data is stored as picture metadata.

If no deferral is desired, a further test 210 is performed to determine whether a primary signal source, e.g., a reliable source such as GPS or the like, is available. If so, then a current position data is determined 212, e.g., a relevant portion of a GPS track log is obtained, and with this data, a current location is associated 214 with the recording, e.g., the current position data is looked up on a map or other resource to identify human-intelligible data.

If the test 210 indicates a primary signal source is not presently available, e.g., one is traveling in area 120 of FIG. 1, then in one embodiment monitored and stored 204 signal sources are used to estimate 216 current position data, and with this data, an estimated current location is associated 218 with a recording. It will be appreciated that various combination techniques and heuristics may be used to best-guess current position data based on identified signal sources. For example, if a certain 802.11 hotspot was recorded, and the position or location of that hotspot is known, e.g., because it transmitted its position or location, or it was looked up on a coverage map (see FIG. 5), then the position or location of this hotspot can be used to approximately identify the locations that occurred near in time to when the hotspot was monitored 204. In one embodiment, characteristics of signal sources can be used to reduce a search area for a current position (see FIG. 4).

If the test 210 indicates determining a current position is not to be deferred, then in one embodiment, the current time is determined and associated 212 with the recording. Then, at a later time, GPS track logs and/or monitored and stored 204 signal sources may be used to identify where various recordings occurred.

Figure 3:
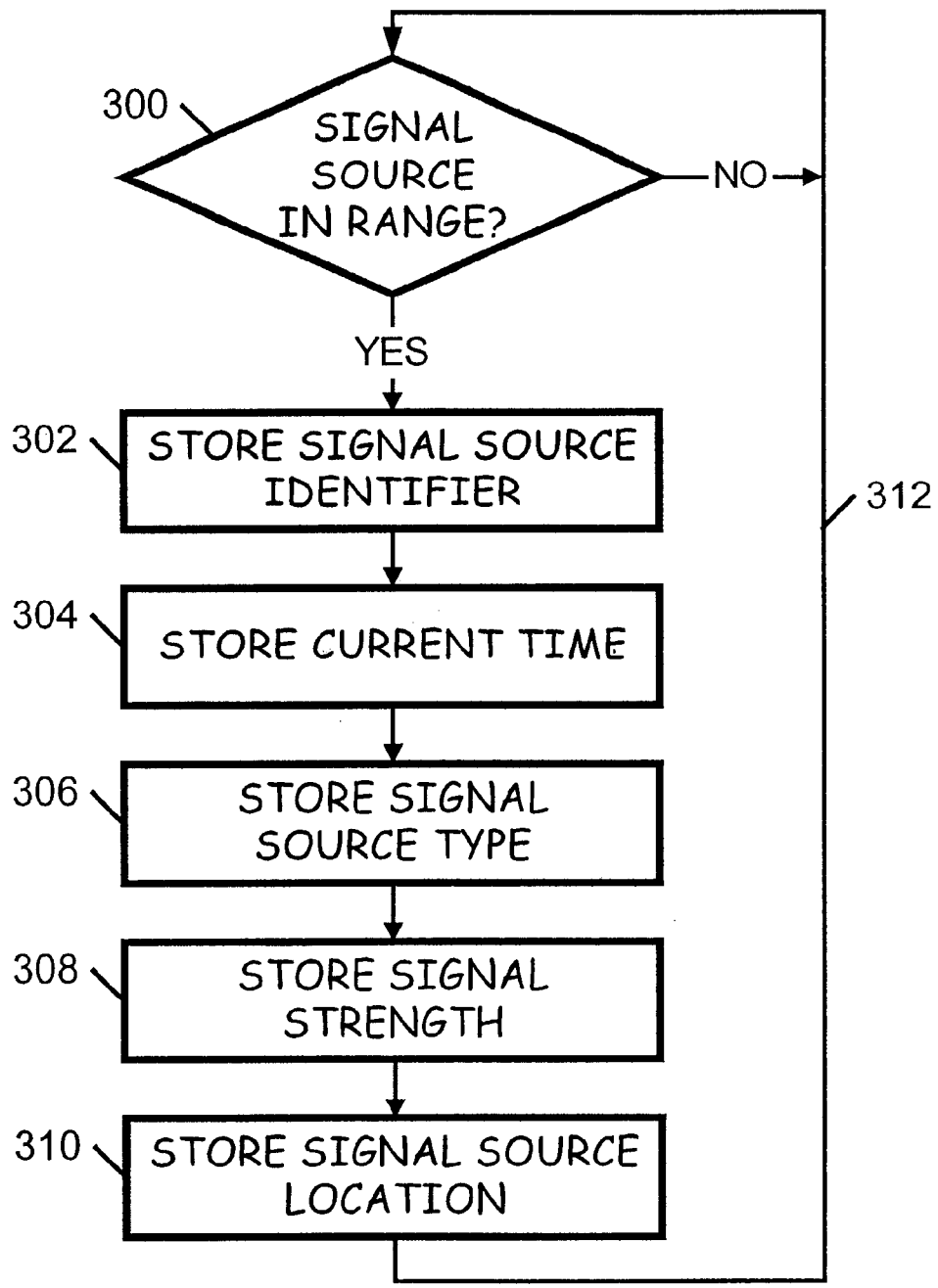
FIG. 3 illustrates a flowchart according to one embodiment of the invention for the FIG. 2 monitoring and storing of signal sources.

FIG. 3 illustrates a flowchart according to one embodiment of the invention for the FIG. 2 monitoring and storing 204 signal sources.

A test 300 is performed to determine whether a signal source is available. Assuming the signal source transmits a self-identifier, this identifier and the current time are stored 302, 304 in a memory. The current time is assumed to be obtained from a clock internal to the receiver of the signal; the clock may be set with respect to an external clock, such one provided by GPS.

In one embodiment, the signal source type is also stored 306. Thus, if the signal source does not provide a self-identifier, the type of signal may be cross-referenced with a coverage map (see FIG. 5) of potential signal sources, time of receipt, last known valid position data, etc. to identify a likely position for the signal source. In one embodiment, the signal source strength is also stored 308 to allow for estimation of distance from the signal source, as well as to facilitate in position triangulation from multiple, and possibly different types of, signal sources.

As location identification becomes more important in this and other technology areas, signal sources may also directly broadcast their physical location; if the signal source provides a position identifier, it is also stored 310. After storing 302-310 data related to a signal source, or if the test 300 indicated there is no available signal source, then processing loops 312.

In one embodiment, mapping between signal sources and their physical location (stationary or moving) may be performed by an external service. One exemplary external service is a cellular telephone network that provides cellular towers, cellular phones, or other devices, with position data. (It will be appreciated that location data may be provided.) In one embodiment, also provided is an error estimate that may be used to account for inherent unreliability in position determination, and/or to account for or predict positions for mobile devices. Supplied position data, and error estimate, if available, may then be used to determine a current location. It will be appreciated the cellular telephone network may utilize proprietary algorithms, such as proprietary triangulation techniques using signal strengths between a device and cellular towers.

Another exemplary external service is a Local Area Network (LAN) manager for computing devices that maps network addresses, e.g., Internet Protocol (IP) addresses into corresponding real-world positions, e.g., network drop locations. As with the cellular telephone network, a proprietary technique may be used to determine real-world positions that may be used to determine a current location. For non-stationary network addresses, an error estimate may be provided with position data. In one embodiment, external services may be provided with a date/time at which a particular signal was received, and the external service provides (perhaps with an associated cost) a location estimate.

It will be appreciated that a general resolution service may be defined such that it operates with multiple external services where one provides the general resolution service with the date/time for receiving a particular signal, and the general resolution service attempts to locate one or more external services that can provide a location estimate for the received signal. Multiple results may be used to sanity-check and/or refine results. For example, assume a laptop computer is attached to a LAN of an outdoor cafe in Portland, Oreg. To determine the laptop's current location, one can inspect positioning service data, such as GPS data, if available, as well as query a general resolution service as discussed above, and determine a set of records such as:

1. Feb. 25, 2002
   15:21:45Z, LAN, 124.145.43.21, lat 45.3456N, lon 122.34654W, alt 122 m, err 45 ft, "info supplied by the local area network"
2. Feb. 25, 2002
   15:22:15Z, GPS, lat45.3455N, lon 122.34655W, alt 115 m, err 17 ft, "info supplied by the GPS satellite receiver on the laptop"
3. Feb. 25, 2002
   15:20:05Z, FM RADIO, KBOO 90.7, lat 45.4897N, lon 122.6964W, alt 900 ft, err 14 miles, "info supplied by the FM radio receiver in the laptop"

Here it can be determined that a GPS receiver in the laptop is providing the most reliable position data to be used to determine a current location. However, were the GPS to be non-functional, then the next best reliable data signal comes from the information provided by the location area network to which the laptop is attached. It will be appreciated that the records may be determined in real time, such as through a live GPS hookup indicated in the $2^{nd}$ record, or not in real time as discussed above. If a recording, such as a photograph, were to occur at the Portland café, then the GPS information would be used to determine a location to be associated with the recording.

Figure 4:
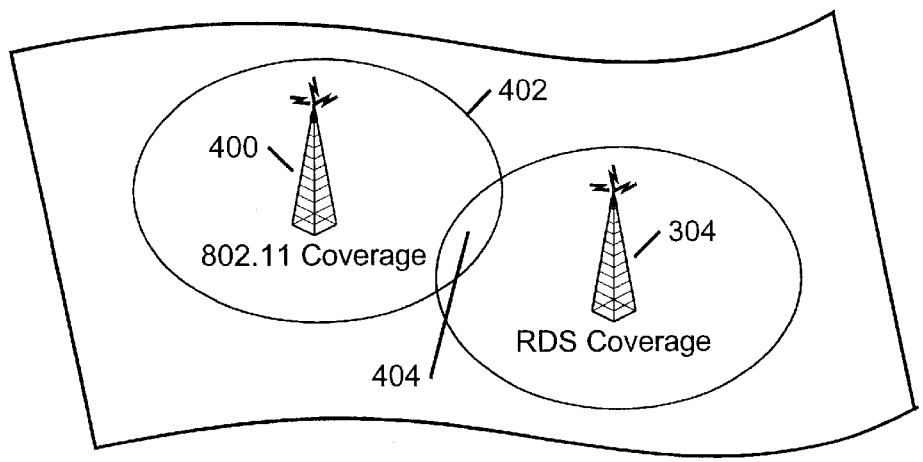
FIG. 4 illustrates using characteristics of signal sources to reduce a search area for a current position.

FIG. 4 illustrates using characteristics of signal sources to reduce a search area for a current position. For example, knowing a particular type of signal source 400 only travels a certain distance, or only by line of sight, etc., can be used to determine an area 402 of possible locations at which the signal was received. If other signal sources were identified and stored 204 (FIG. 2), similar analysis can be performed for other signal sources 404, so that a current position can be narrowed down to having to be within an overlapping area 406 common to both signal sources. Position data can be selected from this overlapping area and used to determine an estimated current location to be associated with a recording. In one embodiment, estimated position data may be compared with last known reliable position data to ensure an identified overlapping area "makes sense".

Figure 5:
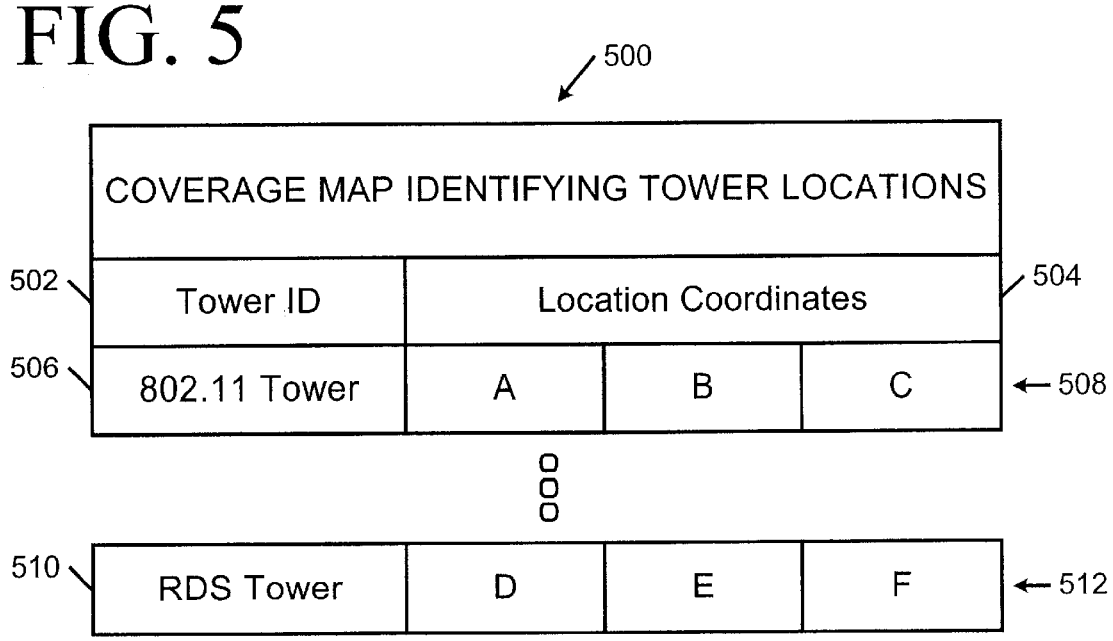
FIG. 5 illustrates using a coverage map identifying signal source positions to narrow the possible locations in which a recording occurred.

FIG. 5 illustrates using database identifying signal source locations to narrow the possible locations in which a recording occurred.

For example, as discussed above with FIG. 2, if it is known a particular type of signal was received, a database 500 storing at least tower identifiers 502 and their coordinates 504 can be inspected to identify potential sources for that signal. For example, the illustrated database includes entries 506, 510 for an 802.11 tower having coordinates 508 A, B, C, and an RDS tower having coordinates 512 D, E, F. Based on the type of signal received, all other potential sources can be eliminated. Then, based on last known valid position data, and/or fundamental trip characteristics, such as planned areas to travel, the most likely sources for a received signal can be identified and used to estimate current position data.

Figure 6:
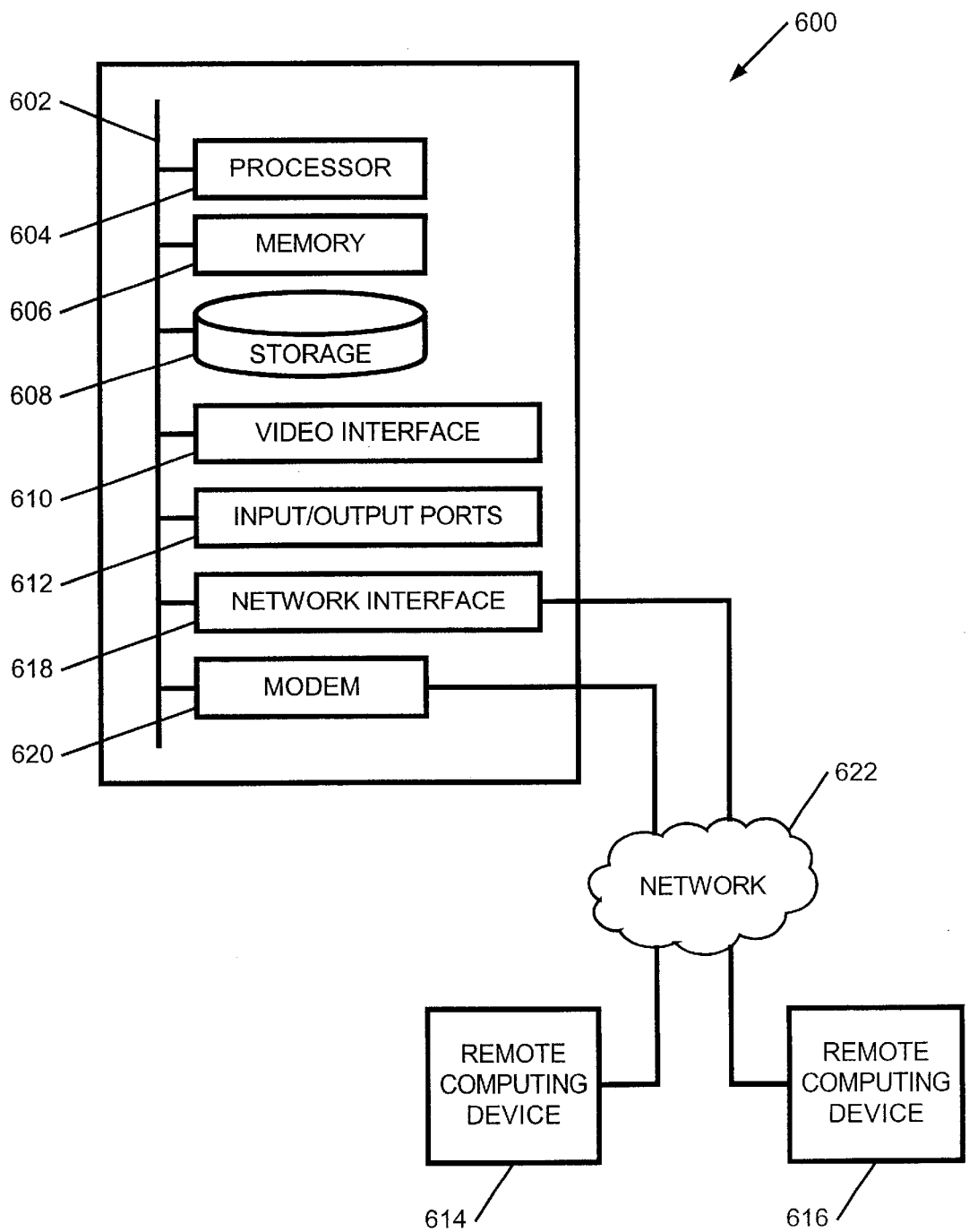
FIG. 6 illustrates an exemplary environment in which certain aspects of the invention may be performed.

It will be appreciated that various embodiments of the invention disclosed above may be performed with various combinations of hardware and/or software. For example, certain aspects of the invention may be implemented with a machine 600 illustrated in FIG. 6.

The illustrated machine has a system bus 602, and typically attached to the bus are one or more processors 604, a memory 606 (e.g., RAM, ROM), storage devices 608, e.g., hard-drives, floppy-disks, optical storage, magnetic cassettes, tapes, flash memory cards, memory sticks, digital video disks, biological storage, etc., a video interface 610, and input/output ports 612. The machine may also include embedded controllers, such as Generic or Programmable Logic Devices or Arrays, Application Specific Integrated Circuits, single-chip computers, smart cards, or the like. The term "machine" includes a single machine, such as a computer, handheld device, digital camera or other digital recording device, or a system of communicatively coupled machines or devices The machine may be controlled, at least in part, by input from conventional input devices, such as keyboards, mice, joysticks, as well as directives received from another machine, a user's interaction with a virtual reality (VR) environment, biometric feedback, or other input. The machine may operate in a network environment using physical and/or logical connections to one or more remote machines 614, 616, such as through a wired or wireless network interface 618 or modem 620, and communicate over a network 622 such as an intranet, the Internet, local or wide area network, cellular, cable, optical, satellite, microwave, "Bluetooth," laser, infrared, etc. It will be appreciated remote machines 614, 616 may be configured similarly to the machine, and therefore may include many or all of the same elements.

The invention may also be described by reference to or in conjunction with program modules, including functions, procedures, data structures, application programs, etc. for performing tasks, or defining abstract data types or low-level hardware contexts. Program modules may be stored in memory 606 and/or storage devices 608 and associated storage media, and may be delivered over transmission environments, including the network 622, in the form of packets, serial data, parallel data, propagated signals, etc. Program modules may be used in a compressed or encrypted format, and may be used in a distributed environment and stored in local and/or remote memory, for access by single and multi-processor machines, portable computers, handheld devices, e.g., Personal Digital Assistants (PDAs), cell phones, etc.

Thus, having described and illustrated the principles of the invention with reference to illustrated embodiments, it will be recognized that the illustrated embodiments can be modified in arrangement and detail without departing from such principles. And, though the foregoing discussion has focused on particular embodiments, other configurations are contemplated. In particular, even though expressions such as "in one embodiment," "in another embodiment," or the like are used herein, these phrases are meant to generally reference embodiment possibilities, and are not intended to limit the invention to particular embodiment configurations. As used herein, these terms may reference the same or different embodiments that are combinable into other embodiments.

Consequently, in view of the wide variety of permutations to the embodiments described herein, this detailed description is intended to be illustrative only, and should not be taken as limiting the scope of the invention. What is claimed as the invention, therefore, is all such modifications as may come within the scope and spirit of the following claims and equivalents thereto.

What is claimed is:

1. A method for determining a current location that may be associated with a recording, comprising:

requesting an estimate of a current location from a server configured to estimate locations based on position data collected from different types of signal sources; and receiving a response from the server comprising at least one estimated current location and a margin of error based on the types of signal sources utilized to determine the at least one estimated current location.

2. The method of claim 1, further comprising:

determining the current location based at least in part on the response;

making a recording; and associating the current location with the recording.

3. The method of claim 1, further comprising:

requesting the current location from an accurate position determination service;

determining unavailability of the accurate position determination service; and requesting the estimate of the current location from the server after said determining unavailability.

4. The method of claim 3, wherein the accurate position determination service comprises a GPS.

5. An article of manufacture to facilitate determining a current location that may be associated with a recording, comprising:

requesting an estimate of a current location from a server configured to estimate locations based on position data collected from different types of signal sources; and receiving a response from the server comprising at least one estimated current location and a margin of error based on the types of signal sources utilized to determine the at least one estimated current location.

6. The article of manufacture of claim 5, whereom the machine-accessible medium further includes data, when accessed, results in the machine performing:

determining the current location based at least in part on the response;

making a recording; and associating the current location with the recording.

7. The article of manufacture of claim 5, wherein the machine-accessible medium further includes data, when accessed, results in the machine performing:

requesting the current location from an accurate position determination service;

determining unavailability of the accurate position determination service; and requesting the estimate of the current location from the server after said determining unavailability.

8. The article of manufacture of claim 7, wherein the data for requesting the current location further includes data, when accessed, results in the machine performing:

requesting the current location from a GPS.

\* \* \* \* \*

UNITED STATES PATENT AND TRADEMARK OFFICE
CERTIFICATE OF CORRECTION

PATENT NO.      : 6,710,740 B2
DATED           : March 23, 2004
INVENTOR(S)     : Needham It is certified that error appears in the above-identified patent and that said Letters Patent is hereby corrected as shown below:

<u>Column 7,</u>
Line 11, delete "whereom" and insert -- wherein --.

Signed and Sealed this

Twenty-fifth Day of May, 2004

JON W. DUDAS
*Acting Director of the United States Patent and Trademark Office*